United States Patent
Nakamura et al.

(10) Patent No.: US 9,366,529 B2
(45) Date of Patent: Jun. 14, 2016

(54) TEXTURE AUTOMATIC MONITORING SYSTEM

(71) Applicants: Dorokogyo Co., Ltd., Hokkaido (JP); Kumataka Engineering, Inc., Kanagawa-ken (JP); Nippo Sangyo Co., Ltd., Tokyo (JP)

(72) Inventors: Kazuhiro Nakamura, Hokkaido (JP); Masayuki Saito, Hokkaido (JP); Yasuaki Amemiya, Kanagawa-ken (JP); Hiroki Sato, Kanagawa (JP); Hironari Abe, Tokyo (JP); Kousuke Abe, Tokyo (JP)

(73) Assignee: Dorokogyo Co., Ltd. (JP)

( * ) Notice: Subject to any disclaimer, the term of this patent is extended or adjusted under 35 U.S.C. 154(b) by 0 days.

(21) Appl. No.: 14/528,462

(22) Filed: Oct. 30, 2014

(65) Prior Publication Data

US 2015/0153167 A1    Jun. 4, 2015

(30) Foreign Application Priority Data

Dec. 4, 2013  (JP) .................................. 2013-250727

(51) Int. Cl.
| | |
|---|---|
| *G01B 11/30* | (2006.01) |
| *G01B 11/00* | (2006.01) |
| *G01B 11/14* | (2006.01) |
| *G01C 9/06* | (2006.01) |
| *E01C 19/28* | (2006.01) |
| *E01C 19/26* | (2006.01) |
| *E01C 23/01* | (2006.01) |

(52) U.S. Cl.
CPC .............. *G01B 11/30* (2013.01); *E01C 19/288* (2013.01); *G01B 11/00* (2013.01); *G01B 11/14* (2013.01); *G01C 9/06* (2013.01); *E01C 19/26* (2013.01); *E01C 23/01* (2013.01); *G01C 2009/066* (2013.01)

(58) Field of Classification Search
None
See application file for complete search history.

(56) References Cited

U.S. PATENT DOCUMENTS

| | | | | |
|---|---|---|---|---|
| 4,878,754 A | * | 11/1989 | Homma ............... | G01B 11/306 356/3.07 |
| 4,896,964 A | * | 1/1990 | Kitazume ............ | G01B 11/306 356/602 |
| 5,967,695 A | * | 10/1999 | Vural .................... | E01C 23/065 404/117 |

FOREIGN PATENT DOCUMENTS

| | | |
|---|---|---|
| JP | 07-318342 A | 12/1995 |
| JP | 2000-131043 A | 5/2000 |
| JP | 3668049 B | 12/2000 |

(Continued)

*Primary Examiner* — Tri T Ton
(74) *Attorney, Agent, or Firm* — Berenato & White, LLC

(57) ABSTRACT

A texture automatic monitoring system for measuring surface texture of a road surface compacted by a road roller is measured by texture measurement equipment mounted on the road roller. The road surface texture measurement equipment comprises a height measurement instrument disposed on the compaction roller that measures height from the road surface, a moving distance detecting instrument that generates a signal corresponding to the moving distance of the road roller, a data processing unit that calculates the moving distance of the road roller based on the moving distance detecting signal, and calculates one or more road surface property values indicating the road surface texture by using the measured value of the height acquired from the height measurement instrument and the calculated moving distance, and a displaying unit which displays the calculated road surface property value.

5 Claims, 11 Drawing Sheets

(56) References Cited

FOREIGN PATENT DOCUMENTS

| JP | 2002-303514 A | 10/2002 |
| JP | 2003-315001 A | 11/2003 |
| JP | 4348690 B | 8/2005 |
| JP | 2006-098397 A | 4/2006 |
| JP | 2012-173095 A | 9/2012 |

* cited by examiner

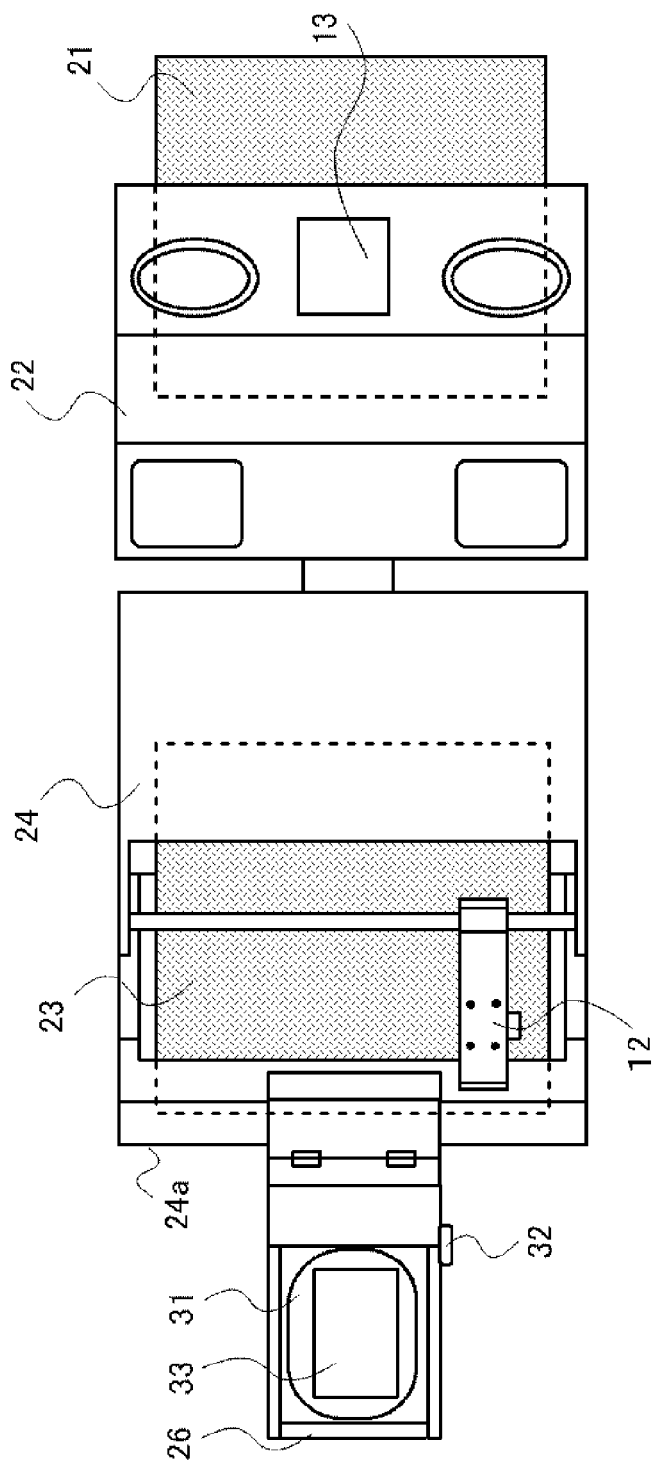

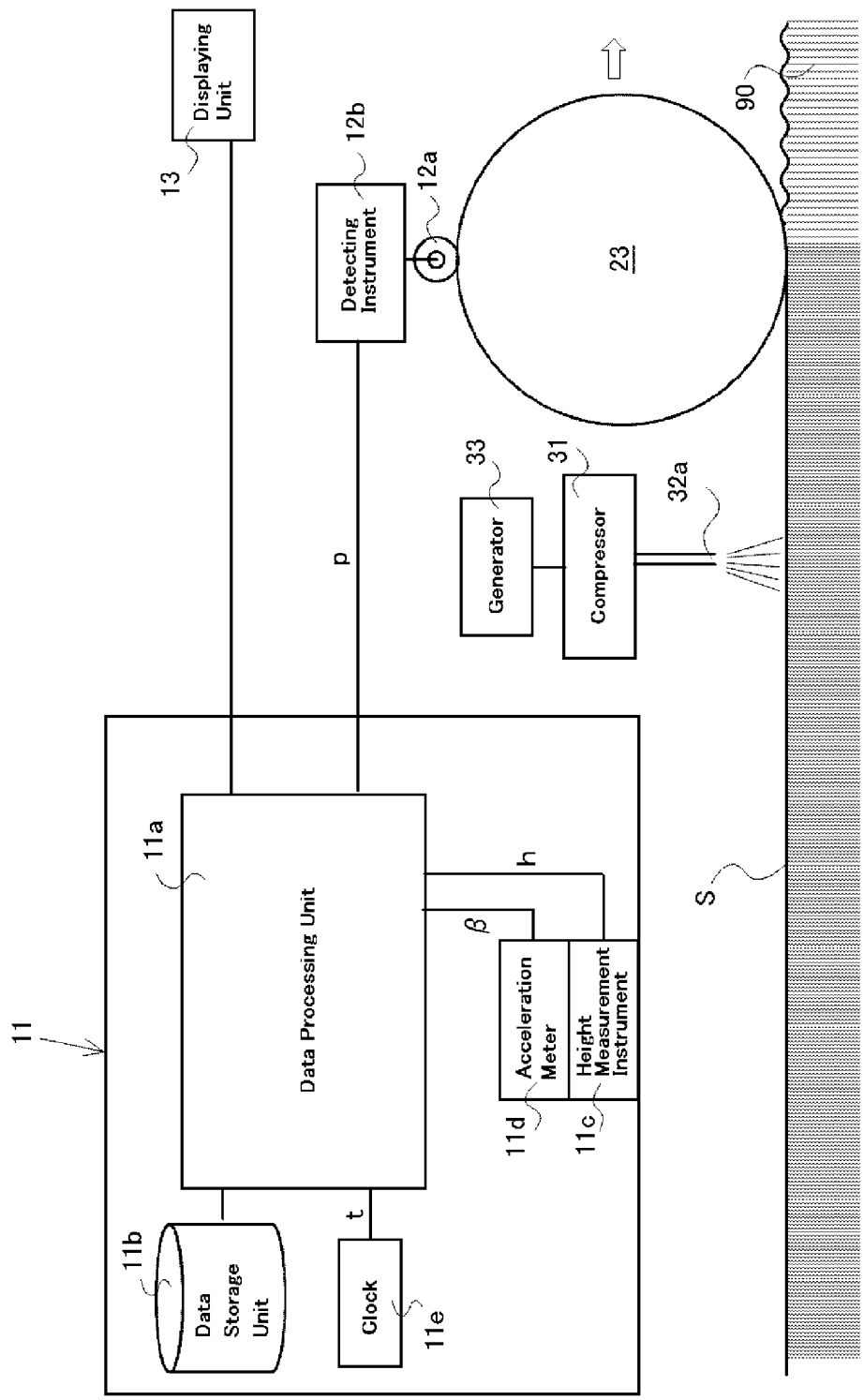

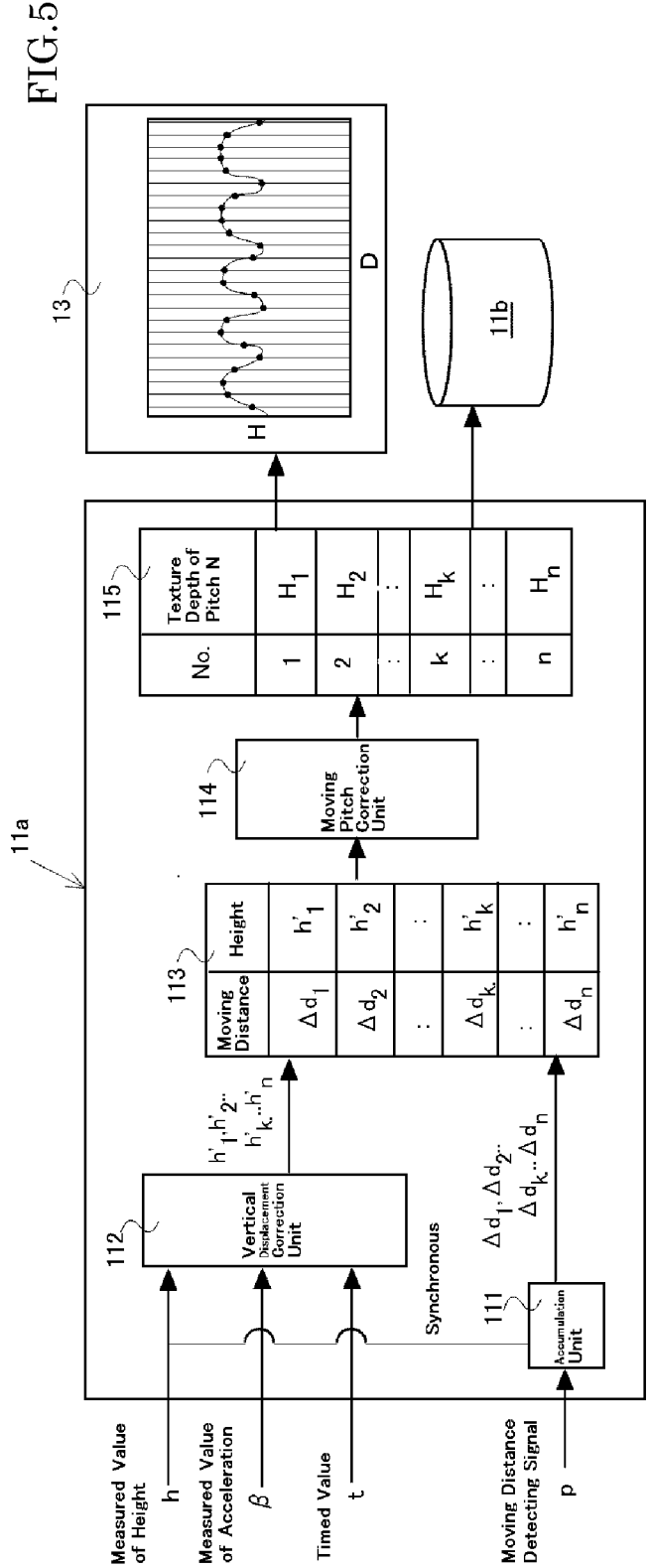

TEXTURE AUTOMATIC MONITORING SYSTEM

CROSS-REFERENCE TO RELATED APPLICATION

This application claims priority to Japanese Patent Application No. 2013-250727, filed Dec. 4, 2013, which is hereby incorporated by reference and to which priority is claimed.

BACKGROUND OF THE INVENTION

The present invention relates to a road roller which is a rolling compaction machine that compacts a pavement material spread on a road surface, in particular, a texture automatic monitoring system including the road roller having a function of measuring the texture of the road surface.

DESCRIPTION OF THE RELATED ART

A method for asphalt paving is, for example, conducted as follows. First, run an asphalt finisher in a single direction to lay and flatten an asphalt mixture. Next, move the rolling compaction machine on the asphalt mixture and compact the asphalt mixture. The rolling compaction is conducted until predetermined target density of the asphalt mixture and flatness of the road surface are obtained. For this purpose, generally, the rolling compaction is repeated plural times on the object area.

The rolling compaction machine utilized in the asphalt paving method is generally called a road roller (such as Japanese Patent No. 3668049). The road roller is provided with a roller having functions of locomotion and compaction. There are various kinds of road rollers, such as a macadam roller and a tired roller. Regarding the kinds of rollers, there are such as a metal drum and a pneumatic tire.

After a completion of the paving method, a road surface property inspection has been conducted for checking a finished state of the road surface, conventionally. Regarding the road surface property inspection, a plurality of road surface property values is utilized as an indicator which indicates a concave-convex condition of the road surface.

The road surface property value indicating the finished state of the road surface within a range of approximately several meters, so-called a road surface flatness, is for example, "3 mσ" or "8 mσ". The road surface property value indicating the road surface flatness is obtained by measuring and calculating with a profilemeter, in accordance with the standard of Japan Highway Public Corporation. The profilemeter tows a wheeled framework having a length of 3 m or 8 m, and measures a moving distance of the framework and a height of a center of the framework from the road surface.

The road surface property value indicating the finished state of the road surface within a range of approximately several centimeters or several millimeters, so-called a road surface texture, is for example, "Texture Depth", "Mean Profile Depth (MPD)" or "Sensor Measured Texture Depth (SMTD)". The road surface texture indicates a degree of concavity and convexity of the road surface within a range of approximately several centimeters or several millimeters, and it indicates a roughness of the road surface. Each of the road surface property values indicating the road surface texture is obtained by measuring and calculating with a respective prescribed texture measurement equipment. The road surface texture is mainly caused by an aggregate of the asphalt mixture. For instance, in the case of a drainage pavement or a porous pavement, the ratio of the rough aggregates is high, thus the texture of a rougher road surface is formed.

In the paving method, a target road surface texture is predetermined. Specifically, one or a plurality of road surface property values corresponding to the target road surface texture is predetermined. An undercompaction by the road roller makes the texture rougher than the target, and an overcompaction makes the texture finer than the target.

The measurement equipments for measuring the road surface flatness are disclosed in Japanese Patent Laid-Open Publication No. H7(1995)-318342, Japanese Patent Laid-Open Publication No. 2003-315001 and Japanese Patent Laid-Open Publication No. 2012-173095, for example. The measurement equipments for measuring the road surface texture are disclosed in Japanese Patent Laid-Open Publication No. 2000-131043, Japanese Patent Laid-Open Publication No. 2002-303514 and Japanese Patent Laid-Open Publication No. 2006-98397, for example. The measurement equipment disclosed in Japanese Patent No. 4348690 has a function which enables to measure more than one kind of the road surface property values with a single equipment.

BRIEF SUMMARY OF THE INVENTION

In the present circumstances, for the paving method, the inspection of the finished state of the road surface is conducted after the completion of the paving method. If the road surface texture was determined rougher than the target (the road surface property value was greater than the target value) as a result of the inspection, further compaction should be conducted by the road roller. On the other hand, if the road surface texture was determined finer than the target (the road surface property value was smaller than the target value), i.e., in the case of the overcompaction, it is almost impossible to reconstitute a former state, once the road surface was overcompacted.

In addition, a manual traction road surface texture measurement equipment is used in general. However, the operation of reciprocating number of times on the object area of the road surface with towing the equipment is a big burden and takes time.

In light of the above circumstances, the object of the present invention is to provide an improved system which enables to inspect the road surface texture by the road roller efficiently and to obtain the targeted road surface texture certainly.

In order to solve the problem, the present invention provides a texture automatic monitoring system having the function of measuring the road surface texture during the compacting operation on a real-time basis.

In accordance with one aspect of the present invention, a texture automatic monitoring system for measuring a road surface texture of a road surface compacted by a road roller having a compaction roller, wherein a road surface texture measurement equipment for measuring the road surface texture is mounted on the road roller.

In the above aspect of the invention, the road surface texture measurement equipment comprises: an height measurement instrument disposed on the rearward of the compaction roller and measures a height from the road surface; a moving distance detecting instrument which generates a moving distance detecting signal corresponding to the moving distance of the road roller; a data processing unit which calculates the moving distance of the road roller based on the moving distance detecting signal, and calculates one or more road surface property values indicating the road surface texture by using the measured value of the height acquired from the height measurement instrument and the calculated moving distance; and a displaying unit which displays the calculated road surface property value.

In the above aspect of the invention, the moving distance detecting instrument detects a rotation angle of the compaction roller.

In the above aspect of the invention, the road surface texture measurement equipment further comprises an acceleration meter which detects an acceleration of the height measurement instrument in a vertical direction, and prior to the calculation of the road surface property value, the data processing unit corrects the measured value of the height acquired from the height measurement instrument by using the measured value of the acceleration acquired from the acceleration meter.

In the above aspect of the invention, the road surface texture measurement equipment further comprises a clinometer which detects an inclination of the height measurement instrument, and prior to the calculation of the road surface property value, the data processing unit corrects the measured value of the height by using the measured value of the acceleration acquired from the acceleration meter and the measured value of the inclination acquired from the clinometer, and corrects the moving distance by using the measured value of the inclination acquired from the clinometer.

In the above aspect of the invention, an injection nozzle for injecting a compressed air toward the road surface is provided between the compaction roller and the height measurement instrument.

The texture automatic monitoring system of the present invention enables to measure the road surface texture right after the compaction of the road surface by the compaction roller because the road roller is provided with the texture measurement equipment. By checking the calculated road surface property value, an appropriate decision could be made whether to repeat further compacting operation or finish the compacting operation.

BRIEF DESCRIPTION OF THE DRAWINGS

FIG. 1B is a schematic plan view of the texture automatic monitoring system illustrated in FIG. 1A.

FIG. 4 is an illustration diagrammatically showing an example of a system configuration of the texture measurement equipment comprised in the texture automatic monitoring system of the present invention.

FIG. 5 is an illustration for schematically describing the process executed by the data processing unit of the texture measurement equipment illustrated in FIG. 4.

DETAILED DESCRIPTION

The present invention will be described below with reference to the drawings. The drawings are showing the examples of the embodiments of the present invention.

As an example of the road roller, there is a macadam roller which has a metal drum as the compaction roller. Another example is a tired roller which has a pneumatic compaction tire. In addition, there is a tandem roller which has metal drums on axles in front and rear. There are other kinds of road rollers. The examples of which the present invention is applied to the tandem roller, are described below, but the present invention can be applied to various other kinds of road rollers.

The texture automatic monitoring system of the present invention is characterized in that the road surface texture measurement equipment for measuring the road surface texture during the compacting operation on a real-time basis is added to the road roller. The term "texture automatic monitoring system" as used herein is intended to mean a system which monitors the road surface texture (texture depth) automatically during the paving method by the road roller.

Figure 1A:
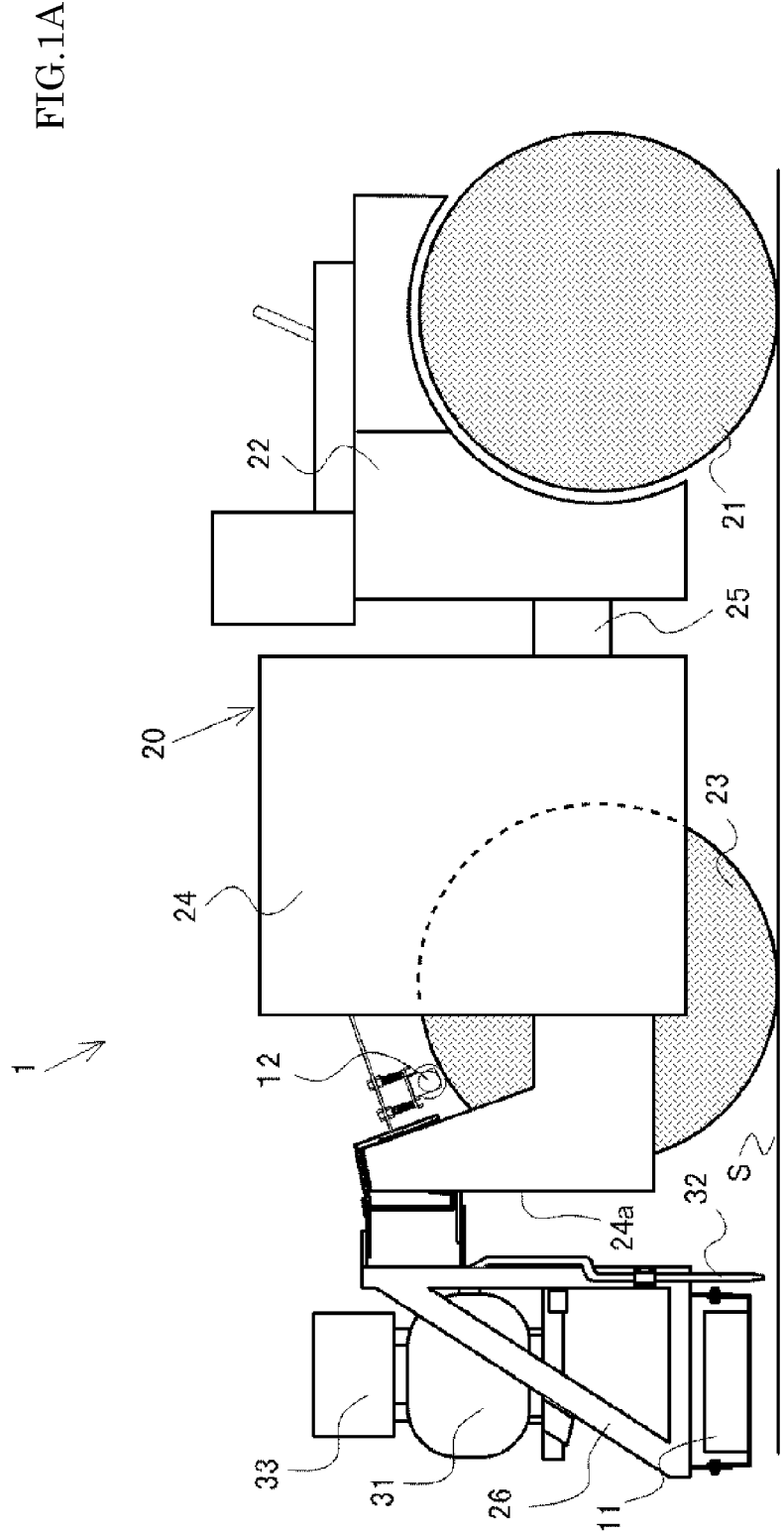
FIG. 1A is a side view schematically showing an example of the texture automatic monitoring system of the present invention.
Figure 2A:
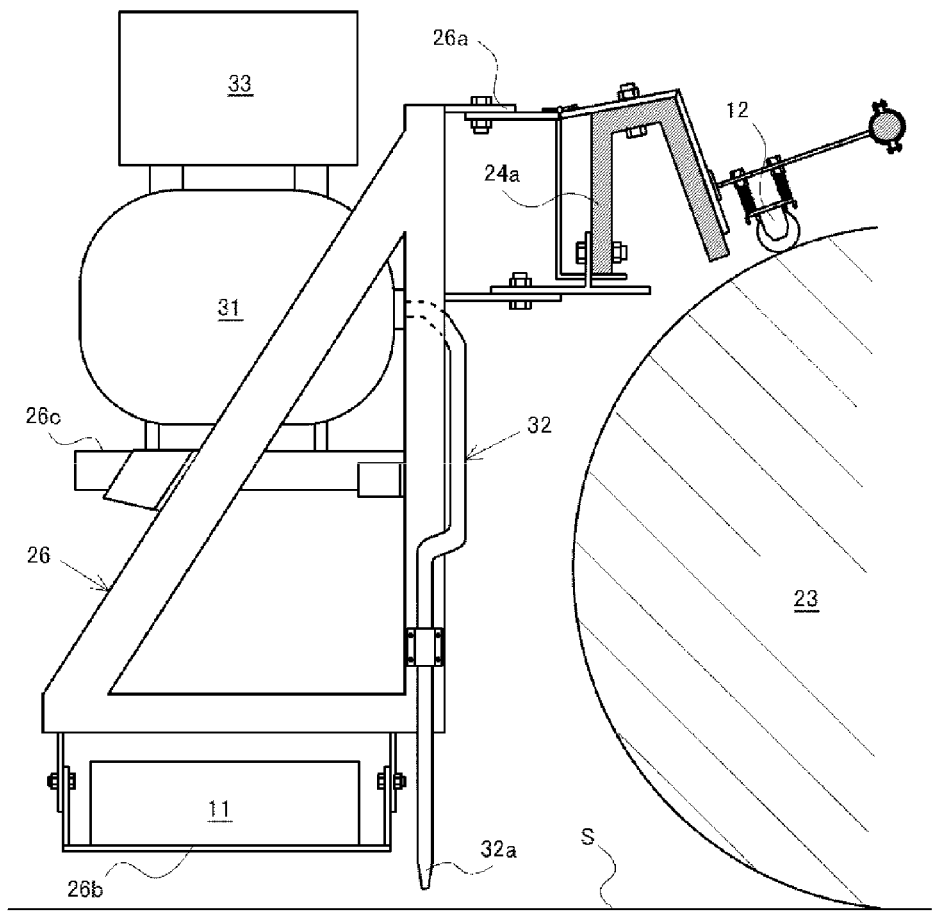
FIG. 2A is an enlarged schematic sectional view of the near portion of backside of the texture automatic monitoring system of FIG. 1A.
Figure 2B:
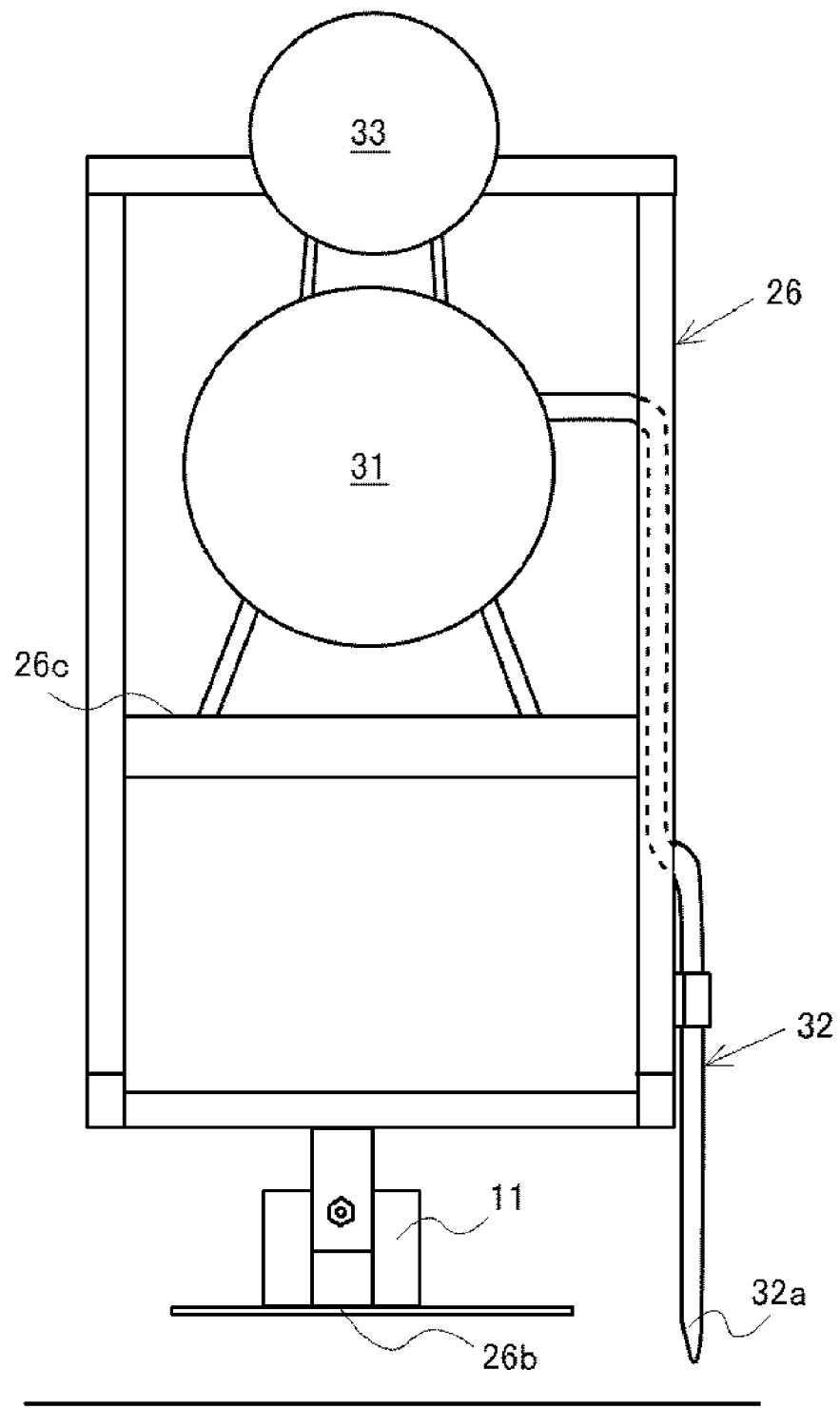
FIG. 2B is an illustration of a part of a support frame illustrated in FIG. 2A viewed from back side.

FIG. 1A is a side view schematically showing an example of the road roller of which the texture automatic monitoring system of the present invention is applied. An example of which the road roller is a tandem roller, is described here. FIG. 1B is a schematic plan view of the road roller illustrated in FIG. 1A. FIG. 2A is an enlarged schematic sectional view of the near portion of the rear part of the road roller of FIG. 1A and FIG. 2B is an illustration of the support frame attached to the rear part of the body, viewed from back side.

Road roller 1 is provided with body 20 as a general configuration. In the illustrated examples, body 20 has a configuration of which front body part 22 and rear body part 24 are connected by connection part 25. On front body part 22, one front side roller 21 is mounted as a compaction roller. On rear body part 24, one rear side roller 23 is mounted as a compaction roller. Each of compaction rollers 21, 23 is drum-shaped, and has a given diameter and a width in an axial direction. The compaction roller has a function of compacting a road surface which is to be paved by its weight and a locomotive function as a running wheel.

Front body part 22 is provided with a cab. The cab is provided with a control device for controlling the locomotion and stoppage of the road roller, and displaying unit 13 which is related to the road surface texture measurement equipment. Displaying unit 13 is preferably a two-dimensional displaying device such as a liquid crystal display. Other simplified examples are such as a numeric indicator and a level meter.

A framework of rear body part 24 has back side frame 24a situated on the back side of rear side roller 23. The shape of back side frame 24a is optional. On the outside of back side frame 24a, support frame 26 is attached via solid fixture 26a. Support frame 26 is protruding rearwardly from back side frame 24a.

Bottom shelf 26b of support frame 26 is situated at a given height from road surface S. Major measurement unit 11 of the road surface texture measurement equipment related to the present invention is mounted on bottom shelf 26b of support frame 26. Major measurement unit 11, for example, contains various kinds of instruments for measuring and data processing inside of a suitable housing.

Air tank 31 and engine unit 33 of an engine compressor are mounted on middle shelf 26c of support frame 26. Engine unit 33 is driven by a generator (not illustrated) attached to the cab and generates a compressed air in air tank 31. The generated compressed air is blown to the near portion of the road surface by air delivery tube 32 connected to air tank 31, and is injected toward road surface S from injection nozzle 32a situated at the end of the air delivery tube. In the illustrated example, injection nozzle 32a has only one injection hole. An injection nozzle which has a plurality of injection holes arranged in a single line, could be attached in the width direction of body 20, as another example.

The shape of illustrated support frame 26 is just an example, so it is not limited to this shape. Support frame 26 is attached to rear body part 24 as they are integrated together and support frame may be capable of mounting each of the above mentioned instruments.

Furthermore, moving distance measurement unit 12 is provided as it abuts the surface of rear side roller 23. Moving distance measurement unit 12 outputs a detecting signal corresponding to the rotation angle of rear side roller 23. The rotation angle of rear side roller 23 is proportional to the moving distance of road roller 1 in the direction of forward movement. The moving distance of road roller 1 may be calculated based on the rotation angle of rear side roller 23 and the diameter of rear side roller 23.

The road surface texture measurement equipment comprised in the texture automatic monitoring system of the present invention is preferably configured as a system including at least major measurement unit 11 for measuring the road surface texture right after the compaction by the road roller, moving distance measurement unit 12 for measuring the moving distance of the road roller and displaying unit 13 for displaying the measured result.

Figure 3A:
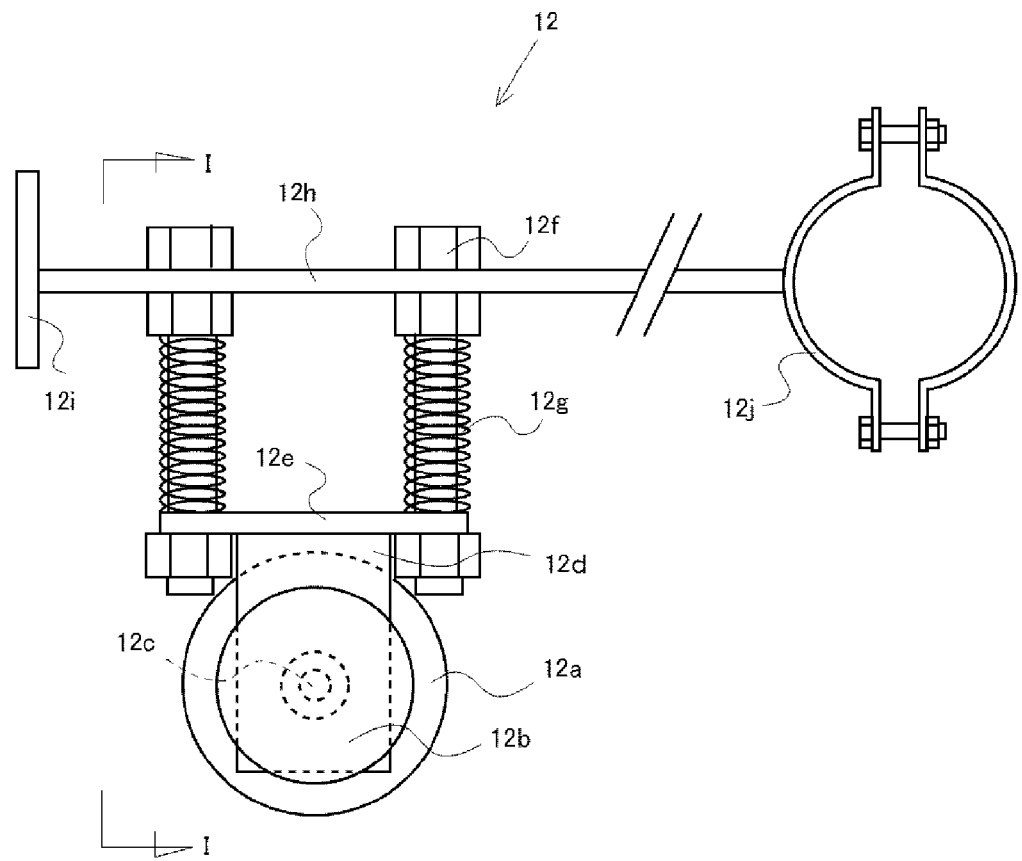
FIG. 3A is an enlarged side view of the moving distance measurement unit.
Figure 3B:
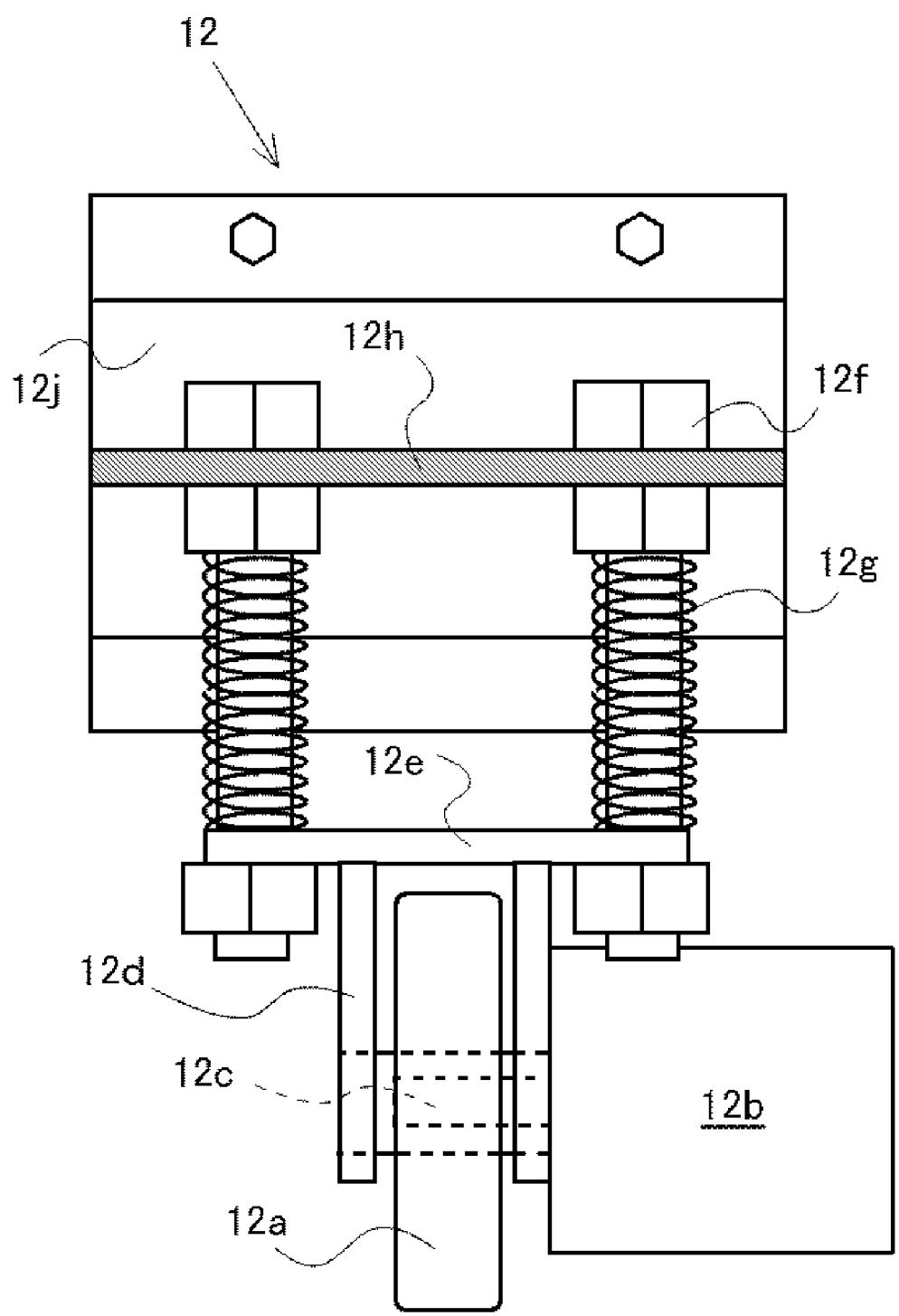
FIG. 3B is a sectional view of FIG. 3A sectioned along the line I-I.

FIG. 3A is an enlarged side view of moving distance measurement unit 12 illustrated in FIG. 2A and FIG. 3B is a sectional view of FIG. 3A sectioned along the line I-I.

Moving distance measurement unit 12 has detecting wheel 12a. Detecting wheel 12a is arranged to abut the surface of rear side roller 23 as shown in FIG. 2A. Detecting wheel 12a is rotatable with axle 12c which is parallel with a rotational axis of rear side roller 23. Therefore, detecting wheel 12a rotates as it follows the rotation of rear side roller 23. The rotation angle of detecting wheel 12a is proportional to the rotation angle of rear side roller 23. Thus the rotation angle of the detecting wheel 12a is proportional to the moving distance of rear side roller 23 i.e., the moving distance of the road roller. Detecting instrument 12b is mounted on axle 12c of detecting wheel 12a. Detecting instrument 12b is preferably a rotary encoder. The rotary encoder detects a rotation angle of a rotating object optically and outputs an electric detecting signal which is proportional to the rotation angle. This electric detecting signal is reflecting the moving distance of the road roller. The moving distance detecting signal outputted by detecting instrument 12b is transmitted to said major measurement unit 11 via a suitable signal line (not illustrated).

Axle 12c of detecting wheel 12a is suspended from wheel support plate 12e intervened by a pair of bearing plate 12d. Wheel support plate 12e is connected to attachment plate 12h with four fixing bolt 12f. Between wheel support plate 12e and attachment plate 12h, spring 12g is situated respectively around each of fixing bolt 12f in a compressed state. Detecting wheel 12a is pressed toward the surface of rear side roller 23 by the elastic force of spring 12g. Thus detecting wheel 12a is able to rotate on the surface of rear side wheel 23 without slipping.

As shown in FIG. 2A, one end 12i of attachment plate 12h is secured to a part of back side frame 24a of rear body part 24 and the other end 12j is secured to a part of framework of rear body part 24. However the securing means of moving distance measurement unit 12 are not limited to the examples in the drawings.

FIG. 4 is an illustration diagrammatically showing an example of a system configuration of the road surface texture measurement equipment comprised in the texture automatic monitoring system of the present invention.

Major measurement unit 11 is provided with height measurement instrument 11c at least. Height measurement instrument 11c measures the height from road surface S with non-contact way, therefore at least its detecting part is situated at a location of which it may expose to road surface S and may measure. Height measurement instrument 11c is a laser range finder or a laser displacement meter, for instance. Height measurement instrument 11c outputs measured value of height h which is an electric detecting signal repeatedly, for example in kHz.

Preferably, major measurement unit 11 is provided with acceleration meter 11d. Acceleration meter 11d is provided for detecting the acceleration in the vertical direction of height measurement instrument 11c. Thus acceleration meter 11d is mounted integrally with height measurement instrument 11c, for example mounted on top side of height measurement instrument 11c. Acceleration meter 11d outputs measured value of acceleration β which is an electric signal. Acceleration meter 11d is a servo acceleration meter, for instance.

Major measurement unit 11 is provided with data processing unit 11a. Data processing unit 11a may be configured as a microcomputer having a microprocessor and a programmable memory, for example. A program for executing prescribed arithmetic processing is written to the programmable memory. Data processing unit 11a further comprises such as a RAM for a temporary storage, an AD converter which converts an analog signal into a digital signal and an interface for external devices. The function as the road surface texture measurement equipment of the present invention may be implemented by the execution of the program by the microprocessor.

Clock 11e for generating a reference frequency is usually annexed to the microcomputer. Clock 11e is, for example, such as a timer circuit having a crystal oscillator. Clock 11e outputs timing signal t with a prescribed frequency.

In addition to measured value of height h from height measurement instrument 11c, measured value of acceleration β from acceleration meter 11d and timed value t of clock 11e, moving distance detecting signal p from detecting instrument 12b of the moving distance detecting unit are inputted to data processing unit 11a. Data processing unit 11a executes the prescribed arithmetic processing using these measured values and signals, and calculates one or more road surface property values indicating the road surface texture of road surface S. The calculated road surface property value is converted into a prescribed displaying form (such as a numerical value, a graph, a chart), and then outputted to displaying unit 13.

Furthermore, to record and store such as the measured data of the road surface texture measurement equipment and the calculated road surface property value, preferably, data storage unit 11b which is an external storage device is provided. For example, a detachable storage element such as a SD card is preferred as data storage unit 11b. Alternatively, data storage unit 11b may be provided with a wireless communication function and the data may be outputted externally via a wireless communication.

In the examples in drawings, major measurement unit 11 is disposed on the rearward of the compaction roller (i.e., rear side roller 23) which is moving forward in a direction indicated with a white arrow. However, the components of major measurement unit 11 other than height measurement instrument 11c and acceleration meter 11d are not necessarily disposed on the rearward of the compaction roller.

As shown in FIG. 4, between the compaction roller (in this case, rear side roller 23) and height measurement instrument 11c, it is preferred to inject the compressed air toward road surface S. By injecting the compressed air, moistures and dusts on road surface S which cause a measurement error could be eliminated. Thus, height measurement instrument 11c may measure more accurately.

FIG. 5 is a block diagram for schematically describing the example of the process executed by data processing unit 11a of the road surface texture measurement equipment illustrated in FIG. 4.

Data processing unit 11a acquires measured value of height h outputted by the height measurement instrument at a prescribed input timing. Data processing unit 11a starts the arithmetic processing synchronously with this input timing of measured value of height h. Measured value of acceleration β outputted by the acceleration meter and timed value t outputted by the clock are inputted synchronously with the input of measured value of height h. Moving distance detecting signal p which is a pulse signal, outputted by the moving distance detecting unit is also inputted.

The variables such as "h", "β" and "t", and below mentioned "Δd" and "α" may mean an entire group consists of each of the plural measured values in some instances, and they may mean any one of the plural measured values in other instances, respectively. In the instances of which they mean any one of the values, they may be indicated with a subscript in some cases.

First, accumulation unit 111 accumulates a unit distance corresponding to one pulse signal each time the pulse signal of moving distance detecting signal p is inputted. Accumulation unit 111 transmits accumulated moving distance Δd synchronously with the input timing of measured value of height h. After transmitting one Δd, the accumulated value is reset and the accumulation will be started again. In FIG. 5, they are indicated as $\Delta d_1, \Delta d_2 \ldots \Delta d_k \ldots \Delta d_n$. Therefore, $\Delta d_k$ indicates the moving distance of which the road roller moved between measured value of height $h_k$ of last time and measured value of height $h_{k+1}$ of this time. Thus measured value of height $h_k$ and moving distance $\Delta d_k$ are corresponding.

Next, vertical displacement correction unit 112 acquires measured value of height h, measured value of acceleration β and timed value t. Vertical displacement correction unit 112 corrects measured value of height h by using measured value of acceleration β and timed value t. This is for correcting the measurement error caused by the vertical displacement of the height measurement instrument. In particular, h is corrected to h' with below formula (refer to Japanese Patent No. 4348690).

$$h' = h + (\Sigma V \Delta t)/2 \quad \text{(formula 1)}$$

(In formula 1, Δt is a difference between the timed value of last time and the timed value of this time. $V = \Sigma \beta \Delta t$)

In FIG. 5, a series of corrected measured values of height is indicated as $h'_1, h'_2 \ldots h'_k \ldots h'_n$. Thus the measured values of the height without any influences of the vertical displacement of the height measurement instrument are obtained.

Moving distance Δd and corrected measured value of height h' are associated each other and stored in temporary memory 113.

Next, moving pitch correction unit 114 calculates a variation curve of the measured values of the height using moving distances $\Delta d_1, \Delta d_2 \ldots \Delta d_k \ldots \Delta d_n$ and corrected measured values of height $h'_1, h'_2 \ldots h'_k \ldots h'_n$ corresponding to each of the moving distances. Since the moving speed of the road roller is not constant, each value of the series of moving distances $\Delta d_1, \Delta d_2 \ldots \Delta d_k \ldots \Delta d_n$ is not constant and it varies. Moving pitch correction unit 114, for example, calculates measured value of height H in the case of which fixed pitch N was 1 mm, by conducting an approximation arithmetic of a polygonal line or an interpolation arithmetic of a high-dimensional function, for example.

Calculated measured value of height H is stored in temporary memory 115. In FIG. 5, the calculated series of measured values of height is indicated as $H_1, H_2 \ldots H_k \ldots H_n$. These values are hereinafter called "texture depth of pitch N". Thus the road surface property value indicating the road surface texture is obtained.

Texture depth of pitch N which is the road surface property value indicating the road surface texture, is converted into a suitable displaying form and transmitted to displaying unit 13 and displayed. For instance, as shown in the drawing, it is displayed in a graph which has total moving distance D on a horizontal axis and texture depth H of pitch N on a vertical axis.

The calculated road surface property value is stored in data storage unit 11b with datum indicating such as a measurement date and time, a measurement location and a targeted value. Measured value of height h which is an original data and corrected measured value h' could be stored in data storage unit 11b therewith.

Figure 6:
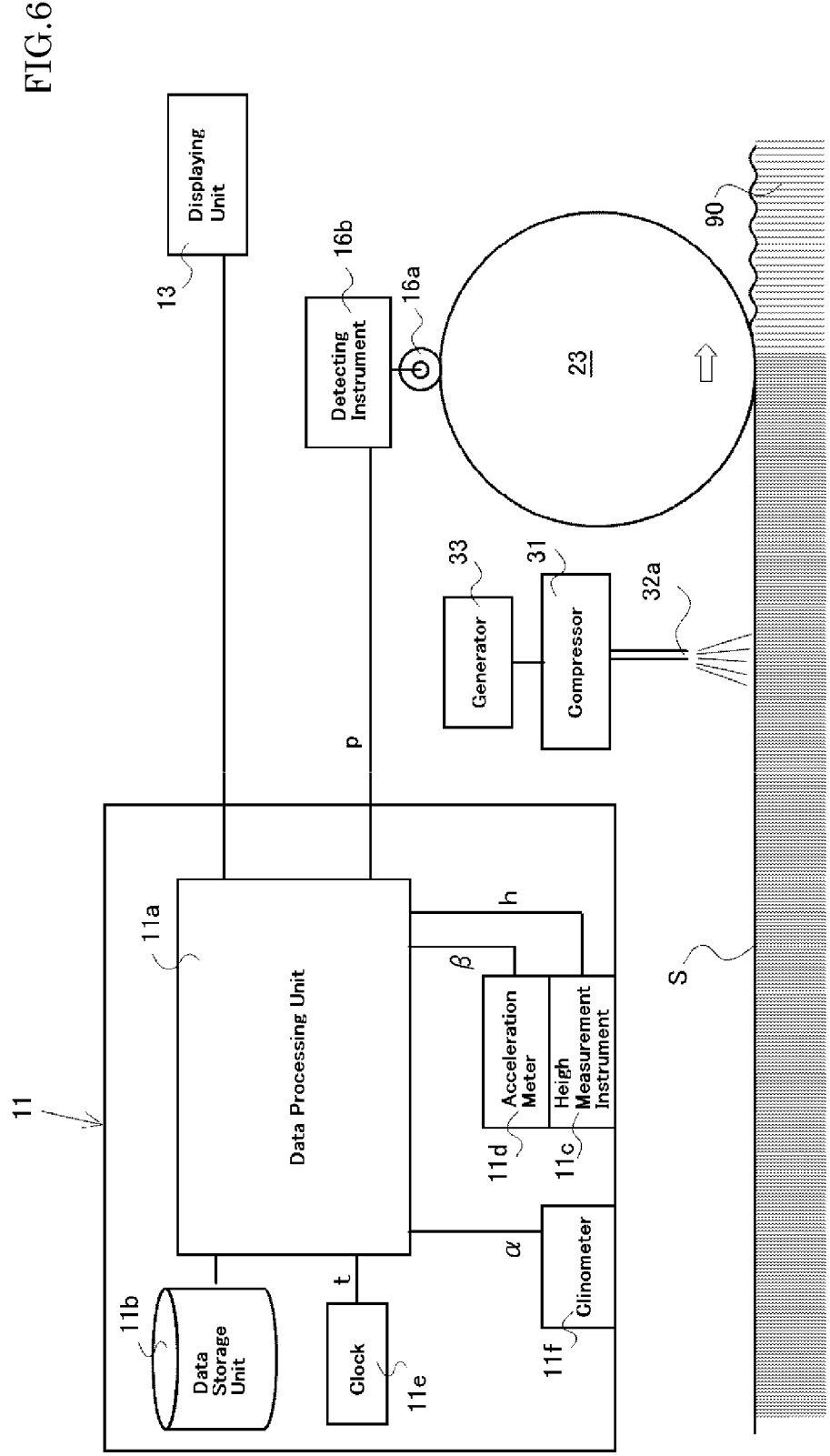
FIG. 6 is an illustration diagrammatically showing another example of a system configuration of the texture measurement equipment comprised in the texture automatic monitoring system of the present invention.

FIG. 6 is an illustration diagrammatically showing another example of a system configuration of the road surface texture measurement equipment comprised in the texture automatic monitoring system of the present invention. Descriptions for the components which are equal to the components of the system configuration in FIG. 4 are omitted.

In the system configuration in FIG. 6, major measurement unit 11 is provided with clinometer 11f and that is a difference from the system configuration in FIG. 4. When the road roller is moving on a sloping road surface, height measurement instrument 11c also inclines because of the inclination of the road surface. Clinometer 11f is provided for detecting the inclination of height measurement instrument 11c. Clinometer 11f outputs measured value of inclination α which is an electric detecting signal. Regarding clinometer 11f, such as a type of which detects a liquid-level change and a type of which detects a direction of an acceleration of gravity, are known.

Similar to the system configuration illustrated in FIG. 4, measured value of height h, measured value of acceleration β, timed value t and moving distance detecting signal p are inputted to data processing unit 11a and in addition to these, measured value of inclination α from clinometer 11f is inputted synchronously with the input timing of measured value of height h. Data processing unit 11a executes the prescribed arithmetic processing using these measured values and signals, and calculates the road surface property value indicating the texture of road surface S.

Figure 7:
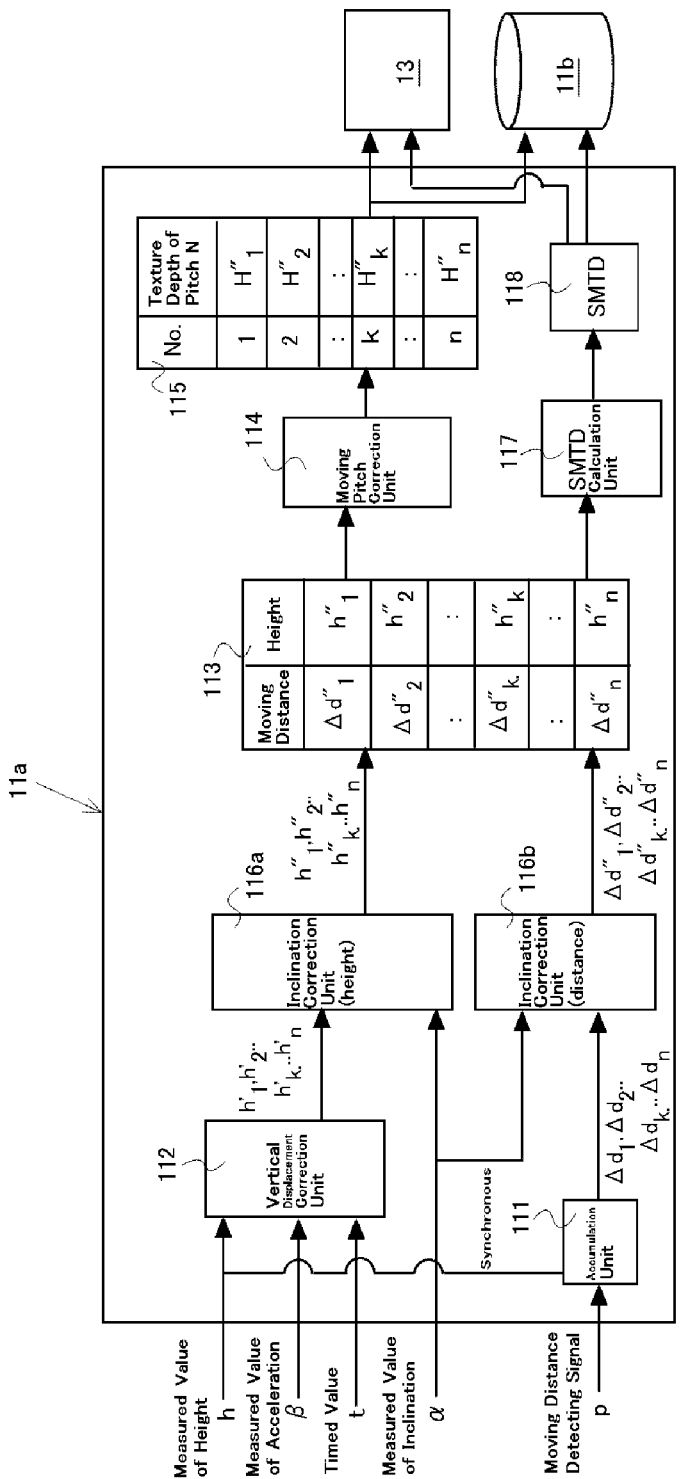
FIG. 7 is an illustration for schematically describing the process executed by the data processing unit of the texture measurement equipment illustrated in FIG. 6.

FIG. 7 is a block diagram for schematically describing an example of the process executed by data processing unit 11a of the road surface texture measurement equipment illustrated in FIG. 6.

Data processing unit 11 starts the arithmetic processing synchronously with the input timing of measured value of height h. Measured value of acceleration β, measured value of inclination α and timed value t are inputted synchronously with the input timing of measured value of height h. Moving distance detecting signal p which is a pulse signal is also inputted.

The processes of accumulation unit 111 are similar to those of illustrated in FIG. 5 that it calculates moving distances $\Delta d_1$, $\Delta d_2 \ldots \Delta d_k \ldots \Delta d_n$ as indicated in FIG. 7.

The processes of vertical displacement correction unit 112 are also similar to those of illustrated in FIG. 5 that it calculates measured values of height $h'_1, h'_2 \ldots h'_k \ldots h'_n$ of which the vertical displacements are corrected, as indicated in FIG. 7.

Then, first inclination correction unit 116a corrects measured values of height $h'_1, h'_2 \ldots h'_k \ldots h'_n$ of which the vertical displacements are corrected, using measured value of inclination α. Concurrently with this, second inclination correction unit 116b corrects moving distances $\Delta d_1, \Delta d_2 \ldots \Delta d_k \ldots \Delta d_n$ using measured value of inclination α.

Measured value of height h' corrected with above formula 1, is further corrected as below and corrected measured value of height h" is calculated (refer to Japanese Patent No. 4348690).

$$h'' = h' \cos \Delta\alpha \quad \text{(formula 2)}$$

(In formula 2, Δα is a difference between the measured value of the inclination associated with the timed value of last time and the measured value of the inclination associated with the timed value of this time. α is an inclination angle of the height measurement instrument relative to the vertical direction. If there was no inclination, α=0)

In FIG. 7, a series of measured values of height corrected with formula 2 is indicated as $h''_1, h''_2 \ldots h''_k \ldots h''_n$.

Moving distance Δd is corrected as below and corrected moving distance Δd" is calculated (refer to Japanese Patent No. 4348690).

$$\Delta d'' = \Delta d - h' \sin \Delta\alpha \quad \text{(formula 3)}$$

In FIG. 7, a series of moving distances corrected with formula 3 is indicated as $\Delta d''_1, \Delta d''_2 \ldots \Delta d''_k \ldots \Delta d''_n$.

Each of the corrected measured value of height h" and moving distance Δd" are associated each other and stored in temporary memory 113.

Then, moving pitch correction unit 114 is similar to that of indicated in FIG. 5, it calculates a variation curve of the measured value of the height using moving distances $\Delta d''_1, \Delta d''_2 \ldots \Delta d''_k \ldots \Delta d''_n$ and corrected measured values of height $h''_1, h''_2 \ldots h''_k \ldots h''_n$ corresponding to each of the moving distances. Moving pitch correction unit 114, for example, calculates measured value of height H" in the case of which fixed pitch N was 1 mm, by conducting an approximation arithmetic of a polygonal line or an interpolation arithmetic of a high-dimensional function, for example.

Calculated measured value of height H" is stored in temporary memory 115. In FIG. 7, a series of measured values of height is indicated as $H''_1, H''_2 \ldots H''_k \ldots H''_n$. Thus texture depth of pitch N which is the road surface property value indicating the road surface texture is obtained. The obtained texture depth of pitch N is displayed on displaying unit 13 and then stored in data storage unit 11b as illustrated in FIG. 7.

Moreover in FIG. 7, SMTD calculation unit 117 which calculates another road surface property value is provided. SMTD calculation unit 117 calculates a SMTD (Sensor Measured Texture Depth) using moving distances $\Delta d''_1, \Delta d''_2 \ldots \Delta d''_k \ldots \Delta d''_n$ and corrected measured values of height $h''_1, h''_2 \ldots h''_k \ldots h''_n$ corresponding to each of the moving distances. The calculation method for SMTD is known. It is outlined that first, determine a regression curve from a series of measured values of height h", and then compute a root mean square of an amount of deviation of each measured values of height h" from the regression curve. The obtained SMTD value 118 is displayed on displaying unit 113 and then stored in data storage unit 11b.

The system configuration of the road surface texture measurement equipment may be conducted in various aspects other than examples mentioned above. Regarding the method for correcting the original data of the measured value of the height measurement instrument, methods other than above mentioned method may be adopted. In addition, values other than above mentioned texture depth of pitch N and SMTD may be calculated as the road surface property value indicating the road surface texture. Furthermore, the moving distance of the road roller may be measured by configurations other than that of mentioned above.

In addition to display the road surface property value on the displaying unit, it may be printed out with a printing device which shall be provided. Furthermore, an acoustic device may be provided for alerting with a voice or an alarm in relation to the road surface property value.

Figure 8:
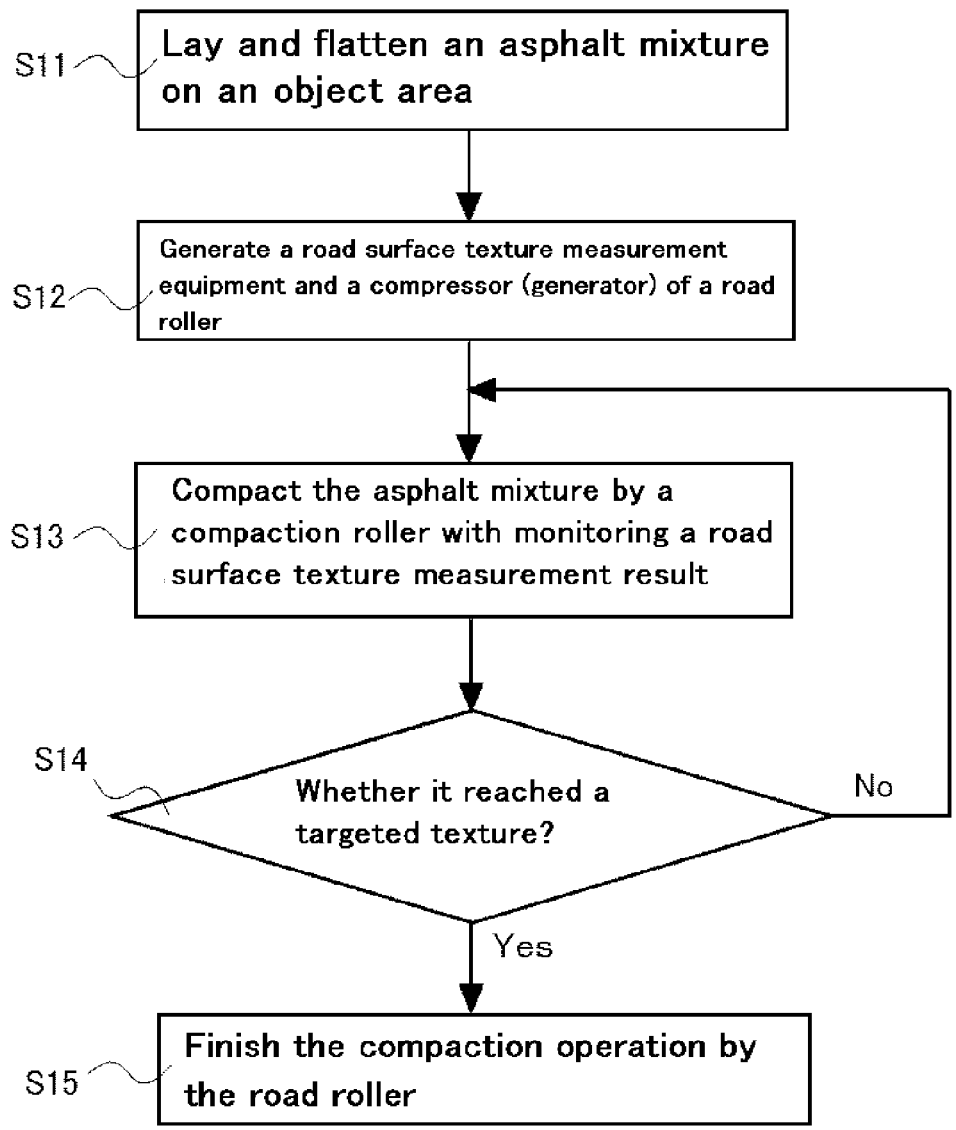
FIG. 8 is a flow chart schematically showing an example of the paving method using the texture automatic monitoring system of the present invention.

FIG. 8 is a flow chart schematically showing an example of the paving method using the texture automatic monitoring system of the present invention.

First, in step 11, the asphalt mixture is laid and flattened on the object area by a machine such as an asphalt finisher. In step 12, right after the time period of which the laid and flattened asphalt mixture is kept at the prescribed temperature (for instance, 110~140° C.), the compacting operation of the road roller is started. At the time of starting the compacting operation, the road surface texture measurement equipment and the compressor of the road roller are activated. In the above examples, for activating the compressor, the generator is activated.

In step 13, the asphalt mixture is compacted with the compaction roller by moving the road roller. At the same time, the road surface texture measurement equipment measures the road surface texture and calculates the road surface property value. An operator monitors the road surface property value with the displaying unit on the cab. It is preferred to display in a manner that enables the monitoring to be easily conducted. For instance, it may be displayed in a manner that enables to grasp the road surface property values of each area included in the overall object extent at a glance. In addition to the road surface property value, such as a targeted value and a current position of the road roller in the object extent may be displayed.

In step 14, the measured result displayed on the displaying unit is determined whether it reached the targeted texture or not.

In step 14, if it was determined that it reached the targeted texture, then in step 15, the compacting operation of the road roller is terminated. In one instance, if the measured result reached the targeted texture, the displaying unit may such as blink or the acoustic device may alert with the alarm for alerting the operator. By conducting such paving method, the overcompaction is prevented.

What is claimed is:

1. A texture automatic monitoring system for measuring road surface texture of a road surface compacted by a road roller having a compaction roller, wherein road surface texture measurement equipment for measuring the road surface texture is mounted on the road roller, and wherein the road surface texture measurement equipment comprises:

a height measurement instrument disposed rearward of the compaction roller and measuring a height from the road surface;

a moving distance detecting instrument which generates a moving distance detecting signal corresponding to a moving distance of the road roller;

a data processing unit which calculates the moving distance of the road roller based on the moving distance detecting signal, and calculates one or more road surface property values indicating the road surface texture by using the measured value of the height acquired from the height measurement instrument and the calculated moving distance;

a displaying unit which displays the calculated road surface property value; and an acceleration meter which detects acceleration of the height measurement instrument in a vertical direction, and prior to the calculation of the road surface property value, the data processing unit corrects the measured value of the height acquired from the height measurement instrument by using the measured value of the acceleration acquired from the acceleration meter.

2. The texture automatic monitoring system of claim 1, wherein the road surface texture measurement equipment further comprises a clinometer which detects an inclination of the height measurement instrument, and prior to the calculation of the road surface property value, the data processing unit corrects the measured value of the height by using the measured value of the acceleration acquired from the acceleration meter and the measured value of the inclination acquired from the clinometer, and corrects the moving distance by using the measured value of the inclination acquired from the clinometer.

3. The texture automatic monitoring system of claim 1, wherein an injection nozzle for injecting a compressed air toward the road surface is provided between the compaction roller and the height measurement instrument.

4. The texture automatic monitoring system of claim 2, wherein an injection nozzle for injecting a compressed air toward the road surface is provided between the compaction roller and the height measurement instrument.

5. The texture automatic monitoring system of claim 1, wherein the moving distance detecting instrument detects a rotation angle of the compaction roller.

* * * * *